Feb. 1, 1966 — A. MUSSCHOOT ETAL — 3,232,431
STEPPED SCREENS
Filed Dec. 13, 1962 — 2 Sheets-Sheet 1
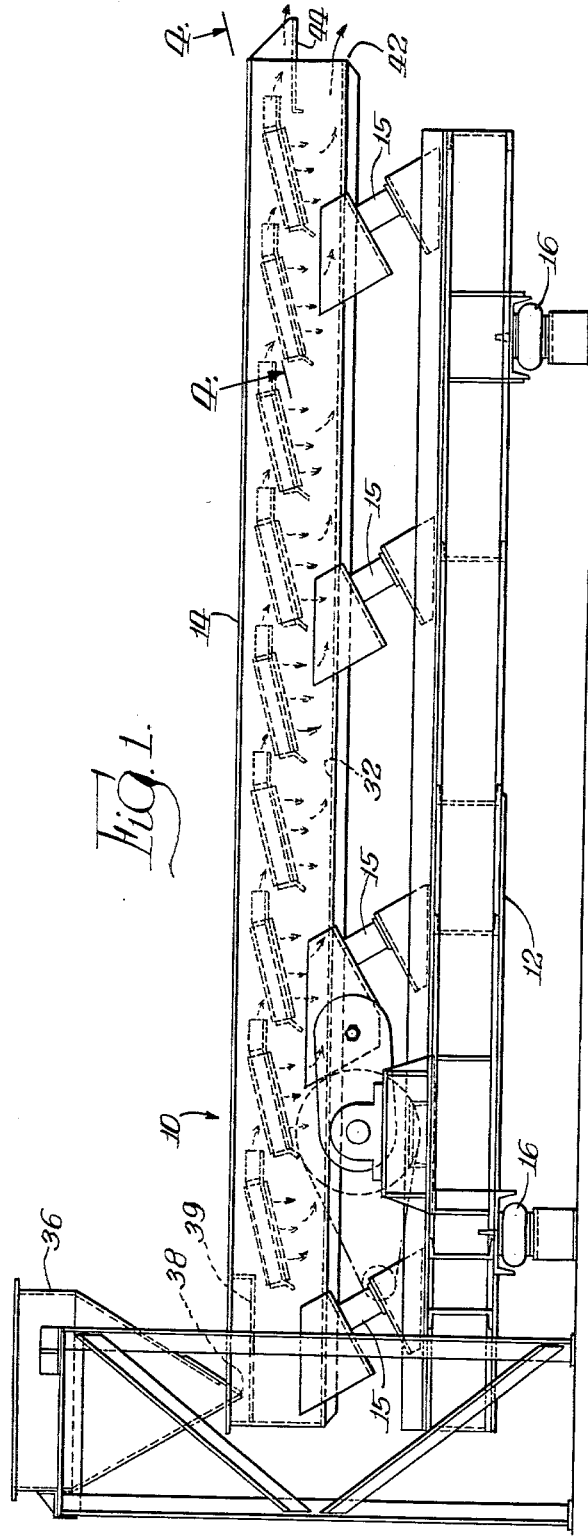
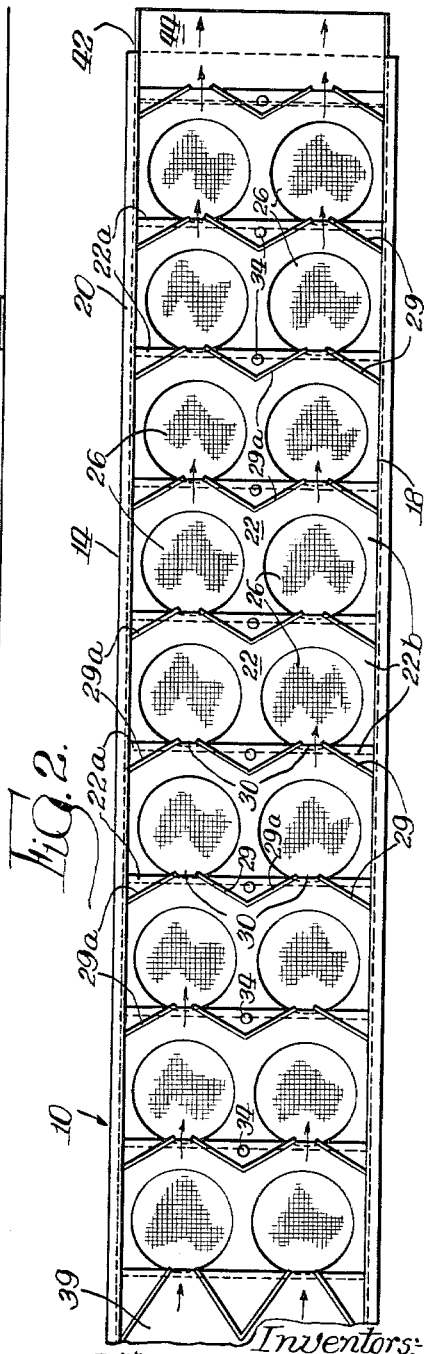
Inventors:
Albert Musschoot,
Marvin G. Thomson.
BY Hofgren, Brady, Wegner, Allen & Stellman Atty's Feb. 1, 1966   A. MUSSCHOOT ETAL   3,232,431
STEPPED SCREENS
Filed Dec. 13, 1962   2 Sheets-Sheet 2
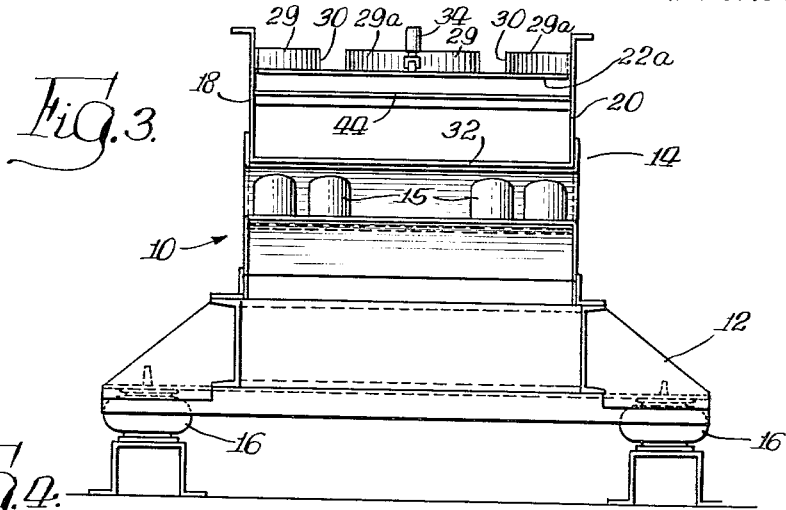
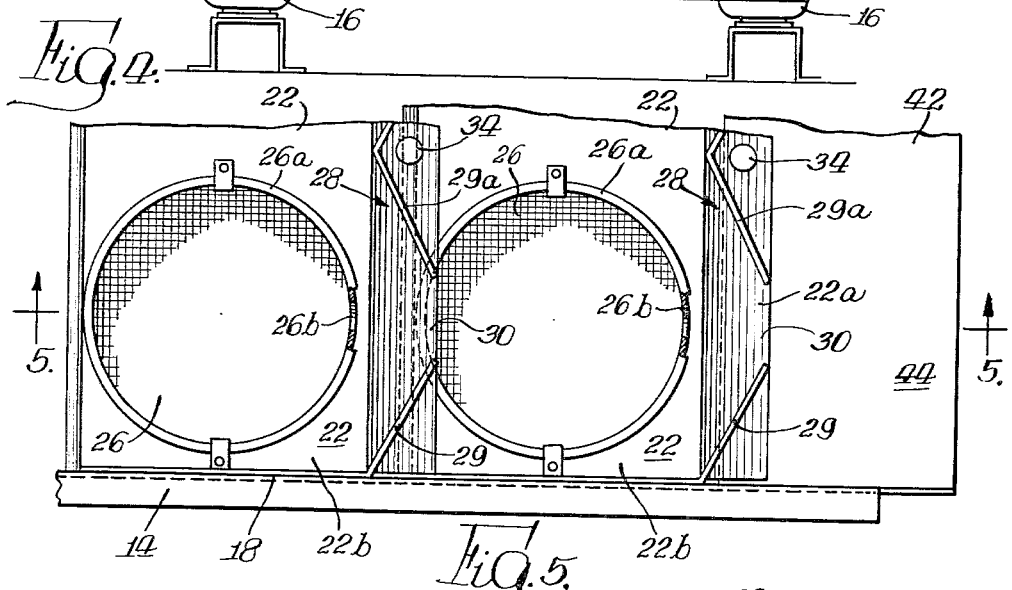
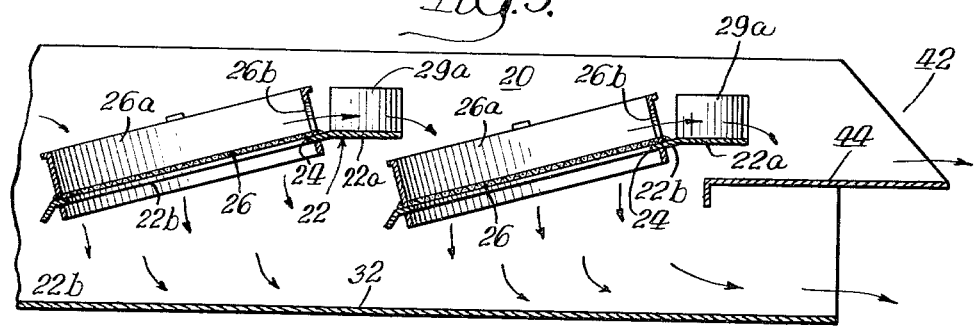

United States Patent Office 3,232,431
Patented Feb. 1, 1966

3,232,431
STEPPED SCREENS
Albert Musschoot, Barrington, and Marvin G. Thomson, Prospect Heights, Ill., assignors to General Kinematics Corporation, a corporation of Illinois
Filed Dec. 13, 1962, Ser. No. 244,405
2 Claims. (Cl. 209—243)

This application relates to a separator and more particularly to a separator for separating fine granules of pulverulent material from coarser granules thereof.

Separating devices which employ a screen over which pulverulent material is moved so that the smaller particles thereof may pass through the screen are often subject to excessive wear due to the clogging of the screen by the particles themselves. Furthermore, the pulverulent material must often be recirculated over the single vibrating screen in order to effectively filter out a high ratio of granules of the size attempted to be separated therefrom.

The present invention provides a separator with a plurality of screens, preferably inclined and overlying each other in series. The screens are subjected to a generally unidirectional vibratory force so that pulverulent material fed to the first of the screens is sequentially advanced along the entire length of the series. The finer particles are sifted through the screens and drop out the bottom thereof as the remainder of the material is advanced thereacross. Furthermore, the screens may be given an agitating action generally normal to the direction of inclination to substantially eliminate agglomeration among the particles of pulverulent material and therefore eliminate clogging of the screens and greatly increase the efficiency of the sifting action thereof.

It is a general object of this invention to produce a new and improved separator for pulverulent material.

It is another object of this invention to produce a new and improved separator for pulverulent material having a plurality of inclined screen surfaces in series mounted in a vibrating frame and over which the pulverulent material is passed to permit the finer particles thereof to filter therethrough.

It is still another object of this invention to provide a new and improved separator for pulverulent material comprising a plurality of inclined screens mounted in series and provided with means for vibrating the screens so that pulverulent material fed to the first of these screens will be advanced sequentially across the series of screens and finer particles thereof will tend to filter through the screens, wherein the screens are also provided with means for agitating the screens in a direction generally normal to the direction of inclination so that agglomeration of particles of the pulverulent material is substantially eliminated, thus providing a separator which is capable of long periods of operation and requiring little or no maintenance.

Other and further objects and advantages of the present invention will be readily apparent from the following description and drawings, in which:

FIGURE 1 is a side elevational view of a device embodying the invention;

FIGURE 2 is a fragmentary top plan view of the device shown in FIGURE 1;

FIGURE 3 is an enlarged end view of the device shown in FIGURE 1;

FIGURE 4 is an enlarged fragmentary view taken along the line 4—4 of FIGURE 1; and FIGURE 5 is a fragmentary section view taken along the line 5—5 of FIGURE 4.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The separator 10 of this invention includes a base member 12 and a frame 14 resiliently mounted thereon, as by mountings 15, in generally parallel spaced relationship thereto. The base member 12 may be provided with resilient mountings indicated generally at 16 for securing it to a floor or the like.

The frame 14 is provided with a pair of generally parallel upstanding walls 18 and 20 extending along the longitudinal extent and at either side thereof. A plurality of cross plates 22 are secured at each end to the wall members 16 and 18 and are mounted therein in parallel spaced relation to each other and generally perpendicular to the aforesaid walls. Each cross plate 22 has a rather narrow lip portion 22a generally parallel to the base of the frame 14 and a large trailing portion 22b inclined thereto.

Each plate 22 is provided with a pair of parallel openings 24 formed in the inclined portion 22b thereof. These openings 24 are adapted to receive foraminous surfaces for separating pulverulent material, such as mesh or screens 26, which are to be mounted therein. Thus, as indicated in FIGURES 1 and 2, the screens and plates comprises a series of inclined surfaces with the upper end of one overlying the lower end of the next in the series. Each surface or screen 26 is provided with an upstanding wall 26a thereabout with each wall having an opening 26b at the upper end thereof positioned in the path of particle movement through the separator.

Also secured to the lip portion 22a of the plates 22 and in the path of particle movement is a channelling means 28. Each channelling means 28 consists of a pair of upstanding barriers 29 and 29a mounted at an angle toward the direction of particle movement. The barriers are spaced apart at the apex of their angle forming an opening or passage 30 which is in register with the opening 26b in the screen wall. The barriers and passage cooperate with the screen wall opening to provide a channel or funnel for directing the particles onto the next screen in the series which has a portion of its periphery underlying that area of the lip 22a whereon the passage 30 is located.

A material receiving means 32 is positioned beneath the several screens and consists generally of a flat bottom deck of the frame 14. This receiving means is adapted to receive the finer particles of pulverulent material which filter through the screens 26 as the material is advanced through the separator.

Each cross plate 22 is provided with an agitating means 34 in the upper end thereof for agitating the screens in a direction generally normal to the direction of particle movement. This agitating means may be any standard type of vibrator apparatus capable of performing such a function. By imparting such agitation to the screens the tendency for particles of pulverulent material to agglomerate is substantially eliminated, thus preventing clogging of the screens and insuring that the finer particles of material will not adhere to the larger particles thereof due possibly to moisture or magnetic attraction.

A feed-box 36 is mounted above the frame 14 at one end thereof for providing a supply source of pulverulent material to be fed to the separator. The feed-box 36 has an opening 38 which feeds into a tray 39 overlying the first of the inclined surfaces. The opening 38 may be provided with a gate (not shown) to regulate the quantity of material being fed therefrom.

Mounted on the base 12 and operatively connected with the frame 14 is a vibrating means 40. This vibrating means 40 may be a conventional device of the type described and claimed in the co-pending application of Albert Musschoot et al., Serial Number 76,657, filed December 19, 1960 now U.S. Patent No. 3,089,582 and also discussed in the co-pending application of Albert Musschoot et al., Serial Number 176,589, filed March 6, 1962. This vibrating means 40 imparts vibratory movement or excitation to the frame 14 generally parallel to the screens 26, thus causing the particles of pulverulent material to be successively advanced across the surfaces of the screens 24 as well as along the surface of the receiving means 32 toward the discharge end 42 of the frame.

Positioned at the discharge end 42 and underlying the upper end of the last plate 22 in the series is a coarse particle receiving tray 44. This tray receives the coarse particles which have not been sifted through the screens in their path of travel. The vibratory means 40 will cause the particles to be dumped off the end of the tray 44 and an appropriate receptacle may be placed thereunder for receiving them.

As material is fed from the feed-box 36 onto the first of the screens 24, the vibratory means 40 causes the material to be advanced across the screens toward the discharge end 42 of the frame 14 in spite of the inclination of the screens. Material of a granulation fine enough to fall through the screens will be successively sifted therethrough as the remainder of material is advanced through the separator. As the finer granules fall on the receiving means 32, they also are successively advanced toward the discharge end 42 due to the excitation imparted thereto by the vibratory means 40. If desired, the plates or frames 22 could be mounted in slots in the side wall members 18 and 20 so that the angle thereof, and therefore the screens, could be adjusted for more acute regulation of the sifting action of the separator.

As the fine and coarse particles reach the discharge end of the separator the fine particles will be on the end of the receiving means 32 and the coarse particles will be on the tray 44. The particles will be expelled from the discharge end of the separator by the excitation of the vibratory means 40. Appropriate receptacles may be placed at the end of the receiving means and below the tray for collecting the separated pulverulent material.

The agitation means imparts a vibration to the screens generally normal to the direction of particle travel and serves to prevent clogging of the screens. Furthermore, when sifting extremely fine material, magnetic attraction or excessive moisture may cause the granules thereof to adhere to the larger granules and thus reduce the efficiency of the separation. This agitator combines a sifting action with the conveying action of the vibrator to substantially limit this tendency to adhere and also increase the efficiency of the operation of the device.

Thus the device of this invention provides a separator which utilizes screens to separate fine particles of pulverulent material from coarser particles thereof. This device eliminates the tendency of the screens to be clogged thus enabling it to operate for longer periods of time without the need for maintenance. Furthermore, the use of a successive number of screens in series produces a more efficient separating action when combined with the vibratory advancement of the granule particles. In addition, the employment of an agitating means to vibrate the screens in a direction generally normal to the direction of particle movement substantially eliminates agglomeration of the particles and also serves to facilitate more efficient separation thereof.

We claim:

1. A separator for pulverulent material, comprising: a base member; a frame resiliently mounted on said base member and spaced thereabove; said frame having a pair of upstanding spaced parallel walls at either side thereof and extending along the longitudinal extent thereof; a plurality of serially arranged generally parallel spaced inclined plates secured at each end to said wall members and generally perpendicular thereto; a screen mounted in each plate; a supply source of said material with openings therein overlying the first of said screens for supplying material thereto; a retaining wall about the screens with an opening at the upper end thereof facing in the direction of particle movement; a trough in said frame below said screens for receiving material filtered therethrough; agitating means on each plate for agitating said screens to prevent agglomeration of particles of said material; means for vibrating said frame in an inclined path generally in the direction of desired particle movement to successively advance some particles of said material across said screens in series, said means for vibrating being mounted on the base member and operatively associated with said frame member; the vibration of said frame serving the finer parts of said material from the coarser parts thereof so that the finer parts are filtered through said screens and deposited on said trough and said coarser parts are continually advanced across said screens whereby said finer and coarser parts are advanced at different levels to the discharge end of said separator.

2. The separator of claim 1 in which there is a pair of screens mounted side by side in each plate.

References Cited by the Examiner

UNITED STATES PATENTS

| 126,683 | 5/1872 | Custer | 209—314 |
| 750,262 | 1/1904 | Cooley | 34—164 |
| 798,382 | 8/1905 | Allard | 209—314 |
| 836,553 | 11/1906 | Bauer | 209—314 |
| 2,247,271 | 6/1941 | Barlow | 209—310 |
| 2,262,351 | 11/1941 | Yurchisin | 198—220 |

FOREIGN PATENTS 4,827 5/1898 Great Britain.

HARRY B. THORNTON, *Primary Examiner.*

HERBERT L. MARTIN, *Examiner.*